March 27, 1928.

K. TJOSSEM 1,664,232

POWER DRIVE ATTACHMENT FOR CORN PICKERS

Filed Dec. 6, 1926

Inventor
Kinney Tjossem
By Lynn H. Latta
Attorney

Patented Mar. 27, 1928.

1,664,232

UNITED STATES PATENT OFFICE.

KINNEY TJOSSEM, OF PAULLINA, IOWA, ASSIGNOR OF ONE-HALF TO SWEN SKAAR, OF PAULLINA, IOWA.

POWER-DRIVE ATTACHMENT FOR CORN PICKERS.

Application filed December 6, 1926. Serial No. 152,829.

My invention relates to a power drive attachment for corn planters, and it is my object to provide, in combination with an ordinary type of corn picking vehicle, a power plant and drive transmission taken from a used automobile and so arranged and adapted, relative to the corn picking vehicle, that it may be used, not only for driving the power take-off or elevator drive shaft of the vehicle, but also for driving the main or travel wheels thereof.

I am aware that it is not new to adapt a second hand automobile power plant and transmission to a corn-picking machine, but those who have done so, have been successful only in driving the power take-off shaft or, as it is technically known, the second elevator drive shaft which serves ordinarily to transmit power received from the main wheels to the various moved parts of the vehicle. As yet, it has not been considered practical or possible to conveniently arrange the power transmission so as to obtain, not only this result, but also the added result of propelling the machine through the field. Consequently, in such power-driven machines, it has been necessary to draw the vehicle in the old way, by means of horses or tractors. My invention successfully propels the machine through the field as well as driving the moving parts thereof.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
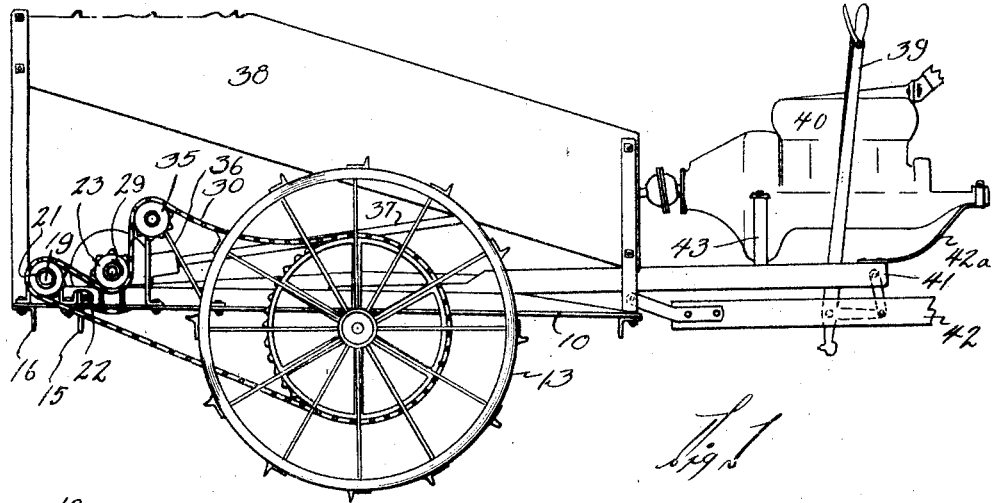
Fig. 1 is a side elevation of a portion of a corn picking vehicle, only enough, thereof, being shown to illustrate the attachment of the second hand automobile power plant and transmission thereto.

My invention is applicable to that type of corn picking machine which includes a frame comprising a pair of longitudinal beams 10 and 11, supported upon the axle 12, which in turn is supported by the main wheels 13. The longitudinal beams 10 are connected at their forward ends by cross beams 14 and at the rear ends by cross beams 15 and 16. The latter two cross beams are extended to support the boxings 17 and 18 in which is journalled the power take-off or second elevator shaft 19. Main drive sprockets 20 are secured to the main drive wheels 13 and are aligned with the sprockets 21 on the shaft 19. Chains ordinarily extend around the sprockets 20 and 21 and are tightened by means of a chain tightener including a bracket arm, journalled in the bracket 22, one of which is shown in Fig. 2, and a sprocket journalled upon the end of said arm and riding upon the chain approximately in the position occupied by the sprocket 23 shown in Fig. 1.

It has not been thought necessary to illustrate this chain tightener construction in the drawings, since it is a well-known construction used on the popular type of corn-picking machine herein described.

Reference has already been made to previous efforts to adapt a second-hand automobile transmission to such a corn picker. In that construction, the rear axle housing has been mounted transversely between the beams 10 and 11 and sprockets placed on the ends of the shaft and aligned with the sprockets 21. A direct drive has been made between the sprockets 21 and the drive sprockets, said drive comprising a chain passing only over the two sprockets.

It has been found that such a direct drive can be obtained by leaving the rear axle transmission in its normal relation to the power plant.

It has not been considered possible to drive both shaft 19 and main wheels 13 from this attached power transmission.

I find, however, that by re-arranging the parts of the transmission and by the proper arrangement of the transmission to the sprockets 21 and 20 respectively, that this can be accomplished. I do it in the following manner.

Figure 3:
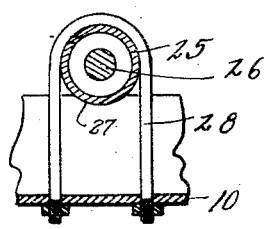
Fig. 3 is a detail sectional view taken on the line 3—3 of Fig. 2.

The chain tightening devices, which have been mentioned but not shown in the drawings, are removed and the rear axle housing 25 of the power transmission device is mounted so as to bring the sprockets 23, which are carried by the rear axle 26 of that transmission, as near as possible to the usual position occupied by the chain tighteners which have been removed. In order to accomplish this and in order to provide for securing the housing 25 to the beams 10 for proper stability, the beams are cut away slightly as at 27 to receive the housing 25 and U bolts 28 are extended through the beams 10 and secured, thereto, as shown in Fig. 3, said U bolts passing over the housing.

Figure 2:
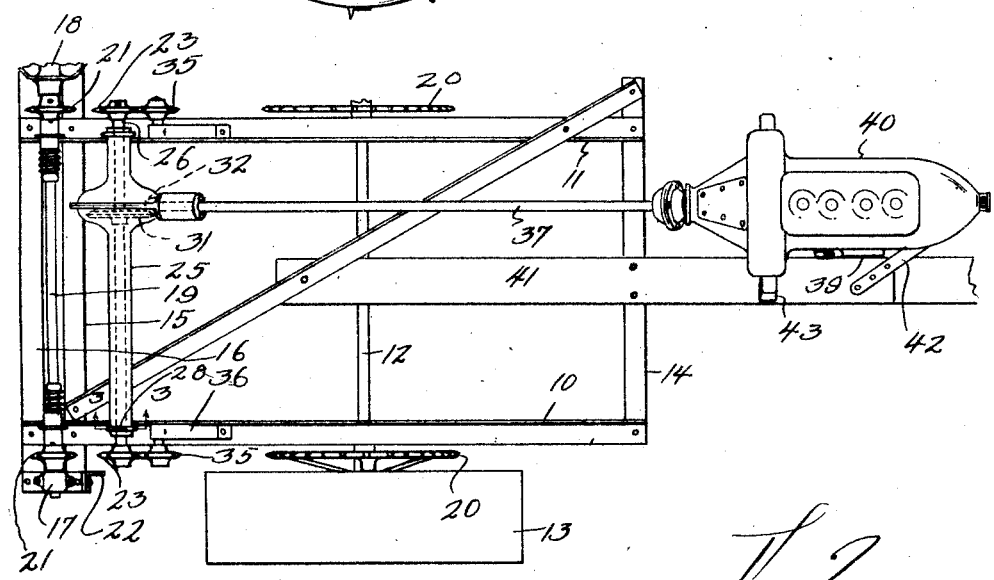
Fig. 2 is a plan view of the vehicle frame illustrating the attachment constituting my invention. The drive chains are not shown.

Were the transmission mechanism allowed to remain unchanged, in the arrangement of the parts from its condition, as found in the automobile from which it came, the direction of rotation given to the sprockets would be opposite to that of the arrow 29 in Fig. 1 and it would be necessary to pass the chain 30 over the sprocket 29 in order to secure the proper direction of rotation.

In so doing, the respective portions of the peripheries of the sprockets 23 and 21, which would be engaged by the chain, would be so small that slipping of the chain upon the sprockets would result.

Consequently, I reverse the position of the ring gear 31 of the transmission so that it engages the opposite side of the drive pinion 32 from that previously engaged. Thus the direction of rotation given to the sprockets 23 will be as indicated by the arrow 29 and the chain 30 is then passed underneath the sprocket 23 in approximately the same position as was originally had, relative to the chain tightener sprocket. Thus the sprockets 23 serve, not only as drive sprockets, but also serve to take the place of the tightener sprockets originally necessary in order to obtain the proper traction of the chain against the sprockets 21. It then becomes possible to gain the proper traction against the sprockets 23 by inserting between the sprockets and the main drive sprockets the idler sprockets 35. The latter sprockets are mounted upon brackets 36 secured to the beams 10 or in any other suitable manner.

It will be understood that the particular mounting of the brackets is immaterial, it being only essential that they be positioned above the sprockets 23 and that the latter be positioned near enough to the sprockets 21 to allow the insertion of the idler sprockets. In this connection, it may be stated that the distance between the wheels 13 and the shaft 19 is actually not quite as great as is shown in the drawings, the latter being somewhat exaggerated for the sake of clearness.

It becomes necessary, therefore, to observe care in providing enough room for the several sprockets between the wheels and the sprockets 21. The removal of the original chain tightener sprockets and the positioning of the sprockets 23 near to the sprockets 21 makes this possible. The positioning of the idlers 35 above the sprockets 23 also aids in securing sufficient room for the several sprockets.

The propeller shaft 37 is positioned to one side of the center of the frame for two reasons, first, in order not to interfere with the husking mechanism 38, and second, in order not to interfere with the tilting lever 39. As to the former, the husking mechanism is positioned to the other side of the longitudinal axis of the frame from the propeller shaft 37 and is not shown in Fig. 2 in order to obtain clearness.

The power plant 40 may now be positioned to one side of the upper stub tongue 41 and secured directly thereto, so that the lever 39 is allowed to extend up between the stub tongue 41 and the power plant and to be operated so as to vary the distance between the upper tongue 41 and lower tongue 42 which is connected to the tongue truck for the purpose of tilting the machine around the axis of the main wheels in the ordinary manner. The usual tilting of the frame is thus left undisturbed by positioning the power plant to one side of the stub tongue and by supporting it entirely upon the upper stub tongue by means of brackets 42 and 43.

I have tested a machine built according to the above description and find that it is successful in the field. The use of a second hand power plant is an advantage in that it makes the cost of motorizing the picker very small and utilizes what is becoming a very extensive waste product, namely, the second hand automobile. The successful application of the invention therefore results in an economical benefit in helping to remove from an overloaded market, a portion of the discarded second hand pleasure cars and the like, which would otherwise be reduced to junk.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In combination with a corn picking vehicle having main wheels, a frame including spaced longitudinal beams supported between said wheels, a main drive sprocket on one of the main wheels, an elevator drive shaft journalled upon the frame, just above said beams, parallel to the main wheel axis and spaced from the wheels, elevator drive sprockets on said shaft, aligned with the main drive sprockets, a chain connecting said sprockets, a power drive attachment comprising an automobile power plant and transmission, mounted upon the frame, the rear axle housing of the transmission being secured transversely upon the beams, power drive sprockets secured to said axle and aligned with the elevator drive and main sprockets, and idler sprockets supported above said power drive sprockets and between them and the main wheels, the chains passing under the power drive sprockets and over the idler sprockets.

2. In combination with a corn picking vehicle having main wheels, a frame including spaced longitudinal beams supported between said wheels, a main drive sprocket on one of the main wheels, an elevator drive shaft journalled upon the frame, just above said beams, parallel to the main wheel axis and spaced from the wheels, elevator drive sprockets on said shaft, aligned with the main drive sprockets, a chain connecting said sprockets, and normally having chain tightening sprockets mounted to ride upon the chain in positions between the elevator drive sprockets and the main drive sprockets, said tightening sprockets being removed, a power drive attachment comprising an automobile power plant and transmission, mounted upon the frame, the rear axle housing of the transmission being secured transversely upon the beams in position to bring the axle thereof substantially in coincidence with the axes of the removed tightening sprockets, power drive sprockets secured to said axle and aligned with the elevator drive and main sprockets, and idler sprockets supported above said power drive sprockets and between them and the main wheels, the chains passing under the power drive sprockets and over the idler sprockets, and the transmission ring gear being reversed in the axle to reverse the direction of rotation thereof from its original direction of rotation.

3. In combination with a corn picking vehicle having main wheels, a frame including spaced longitudinal beams supported between said wheels, upper and lower stub tongues connected with the frame and connected by a tilting lever, a main drive sprocket on one of the main wheels, an elevator drive shaft journalled upon the frame, just above said beams, parallel to the main wheel axis and spaced from the wheels, elevator drive sprockets on said shaft, aligned with the main drive sprockets, a chain connecting said sprockets, a power drive attachment comprising an automobile power plant and transmission, mounted upon the frame, the rear axle housing of the transmission being secured transversely upon the beams, power drive sprockets secured to said axle and aligned with the elevator drive and main sprockets, and idler sprockets supported above said power drive sprockets and between them and the main wheels, the chains passing under the power drive sprockets and over the idler sprockets, and the power plant being secured entirely to the upper stub tongue and at one side thereof so as not to interfere with the operation of the tilting lever.

Signed this 18" day of November, 1926, at Sioux City, in the county of Woodbury and State of Iowa.

KINNEY TJOSSEM.